United States Patent [19]

Michalik

[11] 4,388,990
[45] Jun. 21, 1983

[54] ARTICLE CARRYING ATTACHMENT FOR CONVEYOR CHAIN

[75] Inventor: Anthony J. Michalik, Springfield, Mass.

[73] Assignee: Rexnord Inc., Milwaukee, Wis.

[21] Appl. No.: 785,260

[22] Filed: Apr. 6, 1977

[51] Int. Cl.³ .................... B65G 17/12; B65G 17/32
[52] U.S. Cl. .................................. 198/645; 198/719
[58] Field of Search ............. 198/651, 645, 719, 733, 198/731, 678; 403/41; 295/404, 403; 85/8.3

[56] References Cited

U.S. PATENT DOCUMENTS

| | | | |
|---|---|---|---|
| 382,043 | 5/1888 | Klinik | 74/246 X |
| 2,210,187 | 8/1940 | Ross | 198/651 X |
| 2,463,826 | 3/1949 | Thacker | 85/8.3 |
| 3,256,048 | 6/1966 | Rea | 403/41 X |

FOREIGN PATENT DOCUMENTS 2234115  1/1974  Fed. Rep. of Germany ...... 198/651

Primary Examiner—John J. Love
Assistant Examiner—Douglas D. Watts
Attorney, Agent, or Firm—Theresa F. Camoriano; Vance A. Smith

[57] ABSTRACT

A conveyor chain of the type using extended chain connecting pins to carry articles has short extended connecting pins to which longer conveying pins are attached with a cylindrical coupling bushing. The pin ends are held in the bushing with a light press fit and the bushing is constructed to break away from the extended chain pins if the conveying pins or articles thereon encounter an obstruction in the path of conveyor travel.

4 Claims, 3 Drawing Figures

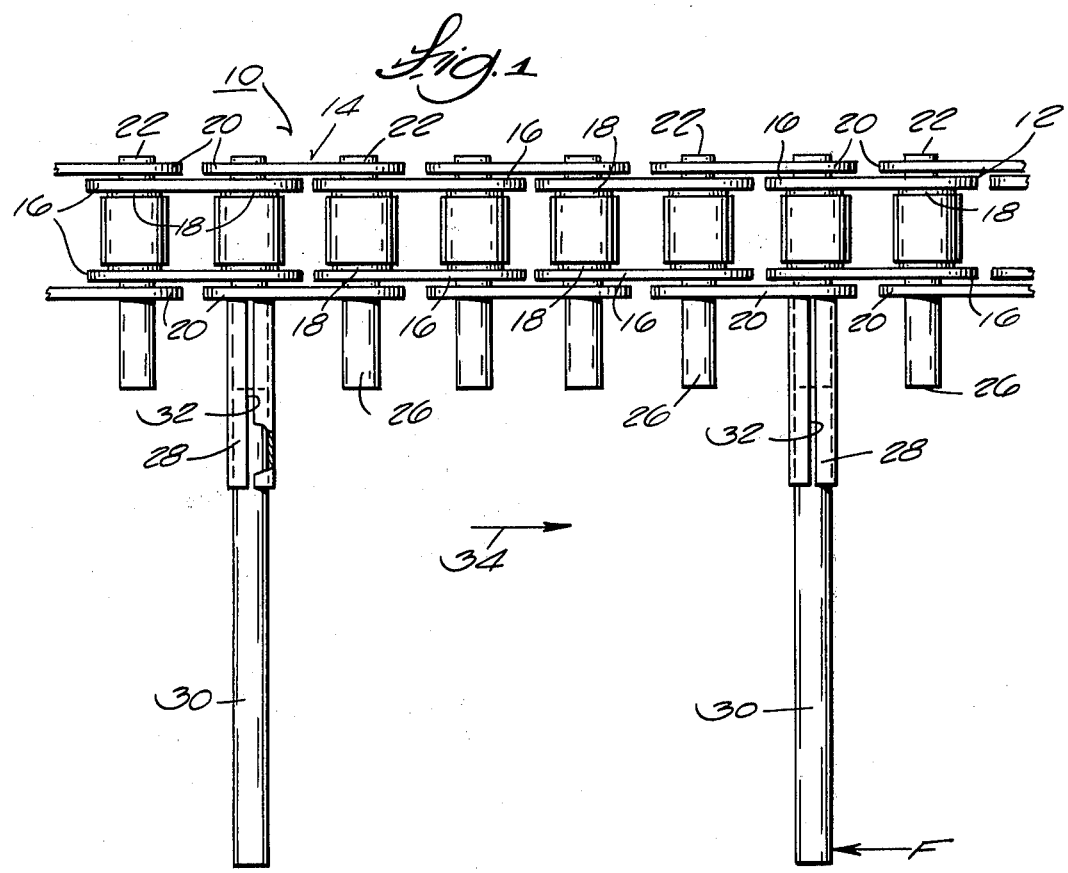
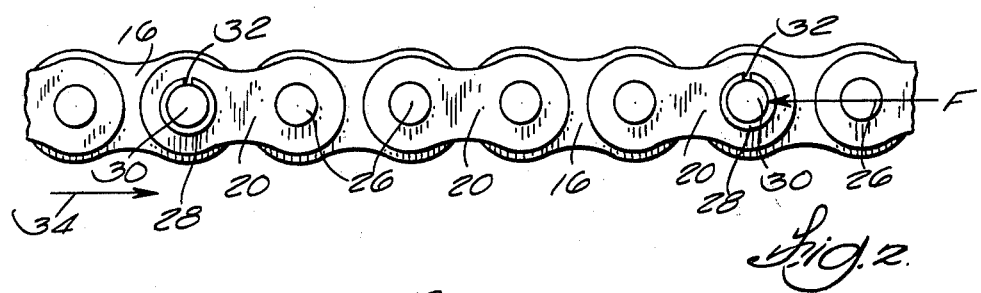
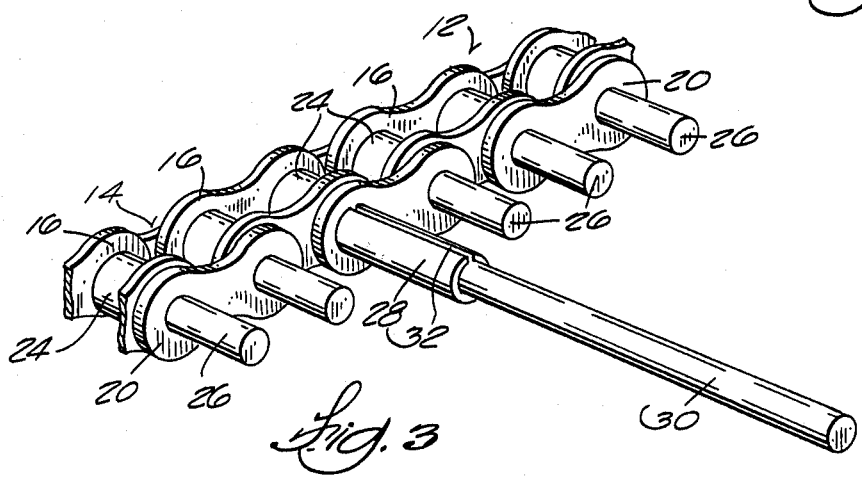

ARTICLE CARRYING ATTACHMENT FOR CONVEYOR CHAIN

BACKGROUND OF THE INVENTION

The present invention pertains to the art of conveyor chains and, more particularly, to relatively long single strand roller chain conveyors which utilize long extended chain connecting pins on which articles being conveyed are carried or attached.

Such conveyors are well known in the art and are used, for example, in the coating of beverage cans and, in particular, to convey the cans through painting and/or coating equipment and into and through a baking or curing oven wherein the drying of painted or laquered surfaces of the cans is speeded. The chains in these conveyors are generally disposed in a vertically oriented serpentine path with the extended chain pins horizontally disposed. The cans or other articles being conveyed are simply placed open-end-first horizontally onto the extended pins and carried along the serpentine course through the coaters and the oven or drying area. The chain used in such conveyors is generally a standard roller chain, with a No. 60 roller chain having a $\frac{3}{4}$ inch chain pitch (distance between link connecting pins) being typical.

To provide the can conveying attachments on these roller chains, selected standard link connecting pins are replaced with long extended chain pins. These extended chain pins thus function both to interconnect the chain links and to carry the cans. In a conveyor designed to carry standard size beverage cans, the spacing of the extended length chain connecting pins may be every six or seven chain pitches or, in a typical No. 60 roller chain, every $4\frac{1}{2}$ to $5\frac{1}{4}$ inches. A typical coating and drying operation will require a conveyor length of from 500 to 800 feet and, thus, from approximately 1000 to over 2000 extended pins for conveying cans. The extended pins, which typically extend about 7 inches outwardly of the chain, must be strong and quite rigid in order to avoid vibration or deflection of the pins which would tend to dislodge the cans. Since a No. 60 roller chain has link connecting pins of approximately $\frac{1}{4}$ inch diameter, the extended length pins (which must also serve as connecting pins) are conveniently of the same diameter and provide the required strength and rigidity.

Over the course of a coating and drying conveyor, and particularly in the serpentine drying portion which comprises the greater portion of the total conveyor length, there are numerous tracking, guiding and supporting structures with relatively small clearances for the moving conveyor chain and attached cans. Frequent slight displacement of the cans on the extended chain pins occurs and snags or jams of the pins and/or cans on the various structures is commonplace and unavoidable. As a result, pin breakage or severe bending frequently occurs and, although a small number of broken pins may be tolerated with little inconvenience, broken pins must eventually be replaced and bent pins may so interfere with conveyor operation that immediate replacement is required. In either case, the conveyor must be stopped and the entire chain disconnected, often in many places. This is both costly and extremely time consuming.

In one prior art attempt to solve this problem, the extended chain pins are notched or grooved at a point outward of the chain links. The notch or groove provides a weakened area in the pin allowing the extended pin to break away if an obstruction is encountered. This controlled break away has helped to solve the problem of bent pins, but has done nothing to resolve the more serious problem of costly connecting pin replacement.

Further, customer needs at times require the use of special materials for the extended chain pins, either for compatibility with the articles being conveyed or because of the environment in which the chain operates. For example, stainless steel pins are often required for carrying cans through the coating and drying operations, however, stainless steel is a poor substitute for plain carburized steel normally used for roller chain connecting pins and the wear life of the chain is adversely affected if stainless steel extended chain pins are used.

Also in some application wherein cans are automatically inserted onto the conveyor chain onto every extended pin if such pin were broken off—missing then the can would be inserted and would fall down and oftentime result in jam-ups plus product loss.

SUMMARY OF THE INVENTION

In the present invention, the long extended chain connecting pins in the above described prior art conveyor chains are eliminated and replaced by a conveying attachment assembly comprising shortened chain link connecting pins which extend only a short distance outwardly of the chain links and to which are attached long conveying pins by means of an intermediate coupling bushing. The coupling bushing, which may be of various constructions and made of various materials, provides a weakened area in the assembly for controlled conveying pin breakaway if an obstruction is encountered; it allows the use of different materials for the conveying pins and the chain connecting pins; and, it provides simple, rapid and inexpensive conveying pin replacement by eliminating the need to disassemble and reassemble the chain. The coupling bushing is further preferably designed to open or break if the conveying pin breaks away so that a damaged and unsuitable coupling cannot be reused. Correspondingly, neither the chain pin nor conveying pin is damaged and may be reassembled with a replacement coupling.

BRIEF DESCRIPTION OF THE DRAWINGS

FIG. 1 is a top plan view of a portion of a conveyor chain including conveying attachment assemblies of the present invention.

FIG. 2 is a side elevation of the chain shown in FIG. 1.

FIG. 3 is a perspective view of a portion of the chain shown in FIGS. 1 and 2 and showing one of the attachment assemblies of the present invention.

DESCRIPTION OF THE PREFERRED EMBODIMENT

In the drawing, a conveyor chain 10 comprises a standard base roller chain made of alternate interconnected bushing links 12 and pin links 14. Each bushing link includes two inner link plates 16 rigidly interconnected by a pair of link bushings 18 pressed into holes in the opposite ends of each inner link plate 16. Each pin link 14 includes two outer link plates 20 rigidly interconnected by a pair of link connecting pins 22 which also extend through an adjacent link bushing 18 to provide an assembly of alternate interconnected chain links. The addition of rollers 24 over the inner link bushings 18 completes what to this point in the description is a standard roller chain.

In the conveyor chain of the present invention, the link connecting pins 22 are extended in length outwardly a short distance from the outer link plates 20. Preferably, all of the connecting pins are of extended length so that the remainder of the conveying attachment assemblies, to be hereinafter described, may be attached to the base chain at any desired spacing. The extended portion 26 of the connecting pin 22 may be of any convenient length, however, in a No. 60 roller chain having a normal connecting pin length of one inch, it has been found that an extended portion 26 of from ⅜ to 9/16 inch is satisfactory.

The balance of the conveying attachment assembly includes a hollow coupling bushing 28 pressed onto the extended portion of the connecting pin and a long conveying pin 30 pressed into the opposite end of the coupling bushing 28. The coupling bushing may be of various sizes and shapes, and made of metal or plastic. The coupling must be of sufficient length to extend beyond the end of the connecting pin extension 26 to allow a conveying pin 30 to also be inserted and held therein. Further, since for ease and uniformity of assembly the coupling bushings are pressed onto the full extended portions 26 and against the outer link plates 20, the bushings should be substantially longer than the extended portions of the connecting pins.

The coupling bushing 28 is designed to be the weakest portion of the assembly. Thus, when a conveying pin 30 or an article being conveyed thereon encounters an obstruction in its path, the coupling bushing will separate or break, thereby avoiding damage to either the conveying pin or the connecting pin. In its preferred embodiment, the coupling bushing 28 is a hollow cylinder of uniform thickness with a through cylindrical bore just slightly smaller than the diameter of the extended portion 26 so that, when the bushing is pressed onto the pin, it will be held thereon by the frictional force of a light interference fit. It has been found, however, that a solid wall coupling bushing requires extremely close tolerances be maintained in the bore so that the fit on both the extended pin and the conveying pin can be controlled. This problem has been solved in the preferred embodiment wherein the bushing 28 is provided with a longitudinal split 32 along its entire length. The bushing 28 constructed in this manner has substantially more flexibility than a solid wall bushing, and variations in the bushing I.D. or pin O.D. are readily compensated for, so that the entire assembly is held with a substantially uniform spring fit regardless of slight variations in the diameters of the assembled parts.

It has also been found that the use of a longitudinally split coupling bushing 28 also provides better control of the breakaway of the conveying pin 30 from the extended portion 26 of the connecting pin 22 when an obstruction is encountered in the conveyor path. Thus, in a conveyor chain 10 operating in the direction of arrow 34, an obstruction encountered by a conveying pin 30 or article being carried thereon will result in a force indicated by the arrow F being imposed on the conveying pin 30 and transmitted through the coupling bushing 28 to the connecting pin extension 26. The split bushing 28 is constructed to open under the force F before either the conveying pin or connecting pin bends or breaks. The length of the coupling bushing is preferably greater than twice the length of the extended portion 26 of the connecting pin, so that the length of the conveying pin within the bore of the bushing is greater than the total length of the extended portion 26 also within the bushing bore. In this manner, the portion of the bushing surrounding the connecting pin extension will tend to open and separate first under a load imposed on the conveying pin. As a result, both the bushing and conveying pin will break away together, making their replacement simpler and more rapid because the damaged coupling bushing will not have to be removed separately.

In actual testing of the conveying attachment assembly, it has been discovered that the force imposed on the conveying pin 30 required to open and cause separation of the bushing from the extended pin varies with the position of the longitudinal split 32. This force has been found to vary from a minimum when the bushing 28 is mounted in its preferred position with the split lying in a plane perpendicular to the pitch line P of the chain (as shown in the drawing), to a maximum when the bushing is rotated 90 degrees and the longitudinal split lies coplanar with the pitch line P. It is believed that this difference in coupling strengths is due to the fact that, in the preferred position, there is only one load bearing moment arm to resist the bending force transmitted to the bushing wall, whereas, in the position of maximum strength, there are two such load bearing moment arms, one in each direction from the split 32.

In the assembly of the preferred embodiment, the coupling bushing 28 is pressed onto the full length of the extended portion 26 of the connecting pin 22 and against the outer link plate 20, and the conveying pin 30 is inserted into the opposite end of the bushing and into engagement with the end of the extended pin 26. Thus, preferred lengths of bushing and respective pin engagements are maintained and, by "bottoming" the conveying pin on the extended portion, the overall lengths of the conveying attachment assemblies may be maintained equal.

I claim:

1. In a conveyor chain of the type having extended link connecting pins to which articles to be conveyed are attached an improved conveying attachment assembly comprising, cylindrical chain link connecting pins extending a short distance outwardly of the chain links, hollow cylindrical bushings for at least some of said connecting pins having lengths exceeding the lengths of the extended portions of said connecting pins, said bushings each being split longitudinally along its full length and having a bore sized to fit over the extended portion of one of said connecting pins and to be held thereon by frictional engagement, and conveying pins each having an end portion sized to fit within the bore of one of said bushings opposite the connecting pin and to be held therein by friction engagement, such that said bushing will open to release said conveying pin without damaging said conveying pin or said connecting pin, under a force imposed against the conveying pin in a direction transverse to the axis of said conveying pin should it encounter an obstruction.

2. The invention of claim 1 wherein the connecting pin and the conveying pin within each bushing are disposed in end to end engagement.

3. The invention of claim 2 wherein each of said bushings is disposed with its longitudinal split lying in a plane perpendicular to the pitch line of the conveyor chain.

4. The invention of claim 3 wherein the length of said bushing is at least two times the length of the extended portion of said connecting pin.

* * * * *